US012762118B2

(12) United States Patent
Emani et al.

(10) Patent No.: US 12,762,118 B2
(45) Date of Patent: Oct. 13, 2026

(54) SYSTEM AND METHOD FOR DATABASE COMMAND QUERY MIGRATION

(71) Applicant: Microsoft Technology Licensing, LLC, Redmond, WA (US)

(72) Inventors: Kameswara Venkatesh Emani, Madison, WI (US); Donald A. Reamey, Redmond, WA (US); Shyam Sundar Sai, Cambridge, MA (US); Manan Goenka, Boston, MA (US); Yiwen Zhu, San Francisco, CA (US); Jia He, Needham, MA (US); Vivek Gupta, Groton, MA (US); Srinivasan S. Turuvekere, Sammamish, WA (US); Charles Webb, Seattle, WA (US); Passaree Robarts, Duvall, WA (US); Avrilia Floratou, Sunnyvale, CA (US); Dhruv Relwani, Bellevue, WA (US); Mark E. Pryce-Maher, Dereham (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/982,259

(22) Filed: Dec. 16, 2024

(65) Prior Publication Data

US 2025/0378072 A1 Dec. 11, 2025

Related U.S. Application Data

(60) Provisional application No. 63/657,652, filed on Jun. 7, 2024.

(51) Int. Cl.
*G06F 16/2452* (2019.01)
*G06F 16/242* (2019.01)

(52) U.S. Cl.
CPC ...... *G06F 16/2452* (2019.01); *G06F 16/2433* (2019.01)

(58) Field of Classification Search
CPC ......................... G06F 16/2433; G06F 16/2452
See application file for complete search history.

(56) References Cited

U.S. PATENT DOCUMENTS

2023/0185781 A1 6/2023 Kumar et al.
2024/0370431 A1* 11/2024 Zmigrod ............ G06F 16/2433

FOREIGN PATENT DOCUMENTS

CN 117421303 A 1/2024

OTHER PUBLICATIONS

Nashid, Retrieval-Based Prompt Selection for Code-Related Few-Shot Learning, pp. 2450-2462 (Year: 2023).*

(Continued)

*Primary Examiner* — Albert M Phillips, III

(57) ABSTRACT

A method, computer program product, and computing system for processing a request to migrate a database command query in a source dialect to a target dialect. An example of the target dialect is obtained by processing the database command query in the source dialect using retrieval-augmented generation (RAG) with the plurality of examples of the target dialect. An instruction is obtained for instructing a generative artificial intelligence (AI) model to translate the database command query in the source dialect to the target dialect by processing the database command query in the source dialect using RAG with the plurality of instructions. A prompt is generated for the generative AI model using the database command query in the source dialect, the example, and the instruction. A candidate database command query is generated by prompting the generative AI model with the prompt to migrate the database command query in the source dialect to the target dialect.

20 Claims, 7 Drawing Sheets

(56) References Cited

OTHER PUBLICATIONS

Zmigrod, Translating between SQL Dialects for Cloud Migration, pp. 1-3, 13 Mar (Year: 2024).*
"GitHub Copilot", Retrieved from: https://github.com/features/copilot?ef_id=_k_4a1aee5262701aefce8a8bfaef152a2d_k_&OCID=AIDcmmc3fhtaow_SEM_k_4a1aee5262701aefce8a8bfaef152a2d_k_&msclkid=4a1aee5262701aefce8a8bfaef152a2d, Retrieved on: Jul. 7, 2025, 10 Pages.
"Introduction to Semantic Kernel", Retrieved from: https://learn.microsoft.com/en-us/semantic-kernel/overview/, Jun. 25, 2024, 3 Pages.
"Language model" Retrieved from: https://en.wikipedia.org/wiki/Language_model, Retrieved on: Jul. 7, 2025, 7 Pages.
"SQL:2008", Retrieved from: https://en.wikipedia.org/wiki/SQL:2008, Retrieved on: Jul. 7, 2025, 2 Pages.
"SQL-ProcBench", Retrieved from: https://github.com/microsoft/SQL-ProcBench, Retrieved on: Jul. 7, 2025, 4 Pages.
"Transact-SQL reference (Database Engine)", Retrieved form:https://learn.microsoft.com/en-us/sql/t-sql/language-reference?view=sql-server-ver16, Dec. 31, 2024, 3 Pages.
"What's Azure AI Search?", Retrieved from: https://learn.microsoft.com/en-us/azure/search/search-what-is-azure-search, May 15, 2025, 5 Pages.
Arun Ulagaratchagan, et al., "Introducing Microsoft Microsoft : Data analytics for the era of AI", May 23, 2023, 8 Pages.
Extended European search report received in European Application No. 25180454.8, mailed on Aug. 8, 2025 12 pages.
Jia, et al., "Accelerating SQL Code Migration using LLMs", Retrieved from: file:///C:/Users/poverma/Downloads/SQL%20Code%20Migration%20Poster.pdf, Retrieved on: Jul. 7, 2025, 1 Pages.
Marco, et al., "Testing Language Models (and Prompts) Like We Test Software", May 24, 2023, 30 Pages.
Qiao, "TaskWeaver: A Code-First Agent Framework," arXiv:2311.17541v3 [cs.AI] Jun. 20, 2024, 31 Pages.
Surabhi, et al., "Procedural Extensions of SQL: Understanding their usage in the wild", In Proceedings of the VLDB Endowment, vol. 14, Issue 8, Apr. 1, 2021, pp. 1378-1391.
Wu, et al., "AutoGen: Enabling Next-Gen LLM Applications via Multi-Agent Conversation", arXiv:2308.08155v2, Oct. 3, 2023, 43 Pages.
Zmigrod et al., "Translating Between SQL Dialects for Cloud Migration", arXiv:2403.08375v1, Mar. 13, 2024, 3 Pages.
Communication pursuant to Rule 59 and Rule 163(2) EPC, received in European Application No. 25180454.8, mailed on Nov. 13, 2025 01 page.

* cited by examiner

402

```
select
        col1
        .col2
        .substr(col3, 1, 10) as p_short_name
        .sum|case when {case(o_date as date)
< to_date['2002-05-08']} then col4 –
coalesce(col5, 0) else 0 end) as col6
        from
          table1 left outer join table2 on
           (col7 = col8 and col9 = col10)
         where col2 = col9
         group by
                col1,col2, substr(col3, 1, 10)
        order by col1
        limit 100;
```

```
select
        col1
        .col2
        .substr(col3, 1, 10) as p_short_name
        .sum|case when {case(o_date as date)
< cast['2002-05-08' as date]} then col4 –
coalesce(col5, 0) else 0 end) as col6
        from
          table1 left outer join table2 on
           (col7 = col8 and col9 = col10)
         where col2 = col9
         group by
                col1,col2, substr(col3, 1, 10)
        order by col1
        offset 0 rows fetch next 100 rows only;
```

400

FIG. 4

```
Following data types are not supported and should be replaced with Alternatives:
| Unsupported data types | Alternatives |
| NUMBER | DECIMAL |
|TIME | TIME(6) |

Following functions are not supported and should be replaced with Alternatives:
|Unsupported functions | Alternatives |
| SUBSTR | SUBSTRING |
| STDDEV_SAMP | STDEV |

Following statements are not supported and should be replaced with Alternatives:
| IF(<condition>) THEN <statement> END IF; | IF(<condition>) BEGIN<statement> END |
| CREATE TEMPORARY TABLE <tablename> | CREATE TABLE #<tablename> |

Other rules:
1. LIMIT number command is not supported, to change to alternatives, first check whether
there exists ORDER BY statement preceeding LIMIT statement:
- Case 1: if ORDER BY statement exists, **ONLY** add OFFSET 0 ROWS FETCH NEXT
number ROWS ONLY immediately after ORDER BY statement, **DON'T** copy existing
ORDER BY statement.
- Case 2: if ORDER BY statement does not exist, add ORDER BY (SELECT NULL) OFFSET 0
ROWS FETCH NEXT 100 ROWS ONLY;
```

500

FIG. 5

SYSTEM AND METHOD FOR DATABASE COMMAND QUERY MIGRATION

RELATED CASES

This application claims the benefit of U.S. Provisional Application No. 63/657,652 filed on Jun. 7, 2024, the contents of which are all incorporated by reference.

BACKGROUND

Structured query language (SQL) is widely used for managing and querying relational databases that store and manage structured data. SQL is a declarative language that allows users to specify the desired results of a database command query without specifying the exact steps to achieve them. SQL is widely used in a variety of applications, including data warehousing, analytics, web applications, and more. Owing to its widespread use, there have been efforts to standardize SQL and other database command queries. Despite these attempts, there are significant differences in the "dialects" of SQL and other database command queries used by different database management systems (DBMSs). These differences can be syntactic, semantic, or both, and can make it difficult to migrate database command queries from one DBMS to another.

BRIEF DESCRIPTION OF THE DRAWINGS

FIG. 4 is a diagrammatic view of an example of a source-target dialect pair;

FIG. 5 is a diagrammatic view of an instruction for migrating from a source dialect to a target dialect;

Like reference symbols in the various drawings indicate like elements.

DETAILED DESCRIPTION OF THE EMBODIMENTS

Embodiments of the present disclosure are directed to enabling migration of data from a source database command query (e.g., SQL) dialect to a target SQL dialect by converting each SQL query in the source dialect to a SQL query in the target dialect. The query management process provides a generative artificial intelligence (AI) model with the database command query in the source dialect and prompting the generative AI model that it is a database command query in the target dialect. In other words, the generative AI model is prompted that the database command query in the source dialect is an erroneous version of a database command query in the target dialect. The generative AI model is instructed to resolve the errors in the database command query to generate a database command query in the target dialect with no errors. This causes the generative AI model to convert the database command query in the source dialect to the database command query in the target dialect. The migration from the source database command dialect to the target database command dialect is then enabled to take place by performing operations on the database using the database command query in the target dialect.

As discussed above, there have been significant efforts to standardize database command queries, although differences continue to exist making query migrations substantial investments. However, the differences in these dialects are not arbitrary. Individual SQL queries across dialects adhere to a similar structure, with differences arising due to the choice of keywords, operators, and the semantics of these constructs. For stored procedures, which interleave SQL queries with imperative constructs, the perceived differences can be more pronounced due to the larger language surface. Upon closer examination, SQL stored procedures are still a sequence of SQL queries with control flow constructs, and individual queries within the procedure continue to share commonalities across dialects. The source query (i.e., the database command query in the source dialect) conveys the intent of the data processing logic and the target query should reflect the same intent. These insights enable database command query migration to be addressed as a program repair problem, where the source query is treated as an erroneous query that needs to be fixed to generate the target query (i.e., the database command query in the target dialect).

Figure 1A:
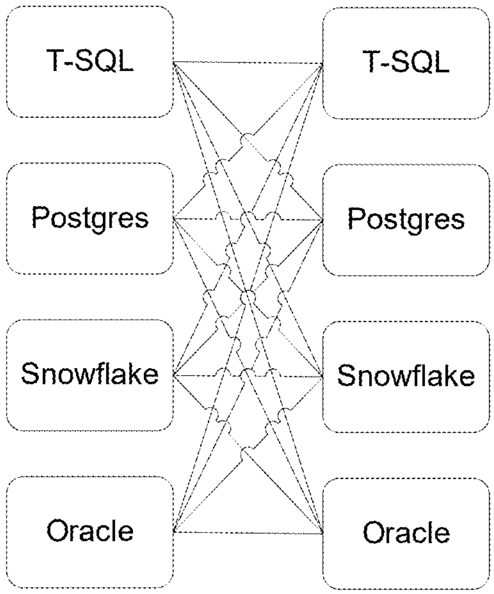
FIG. 1A is a block diagram illustrating a conventional database command query migration process.
Figure 1B:
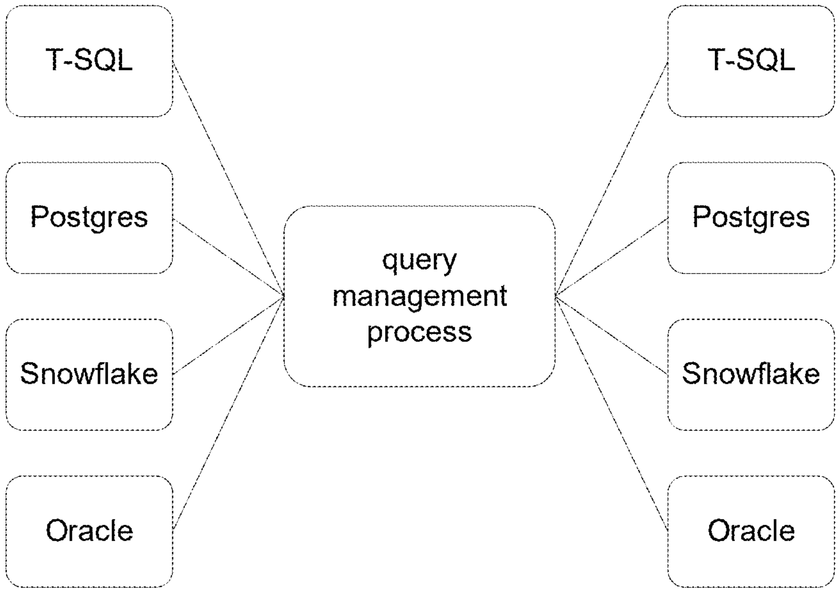
FIG. 1B is a block diagram illustrating a query migration process in accordance with an embodiment of the disclosure.
Figure 2:
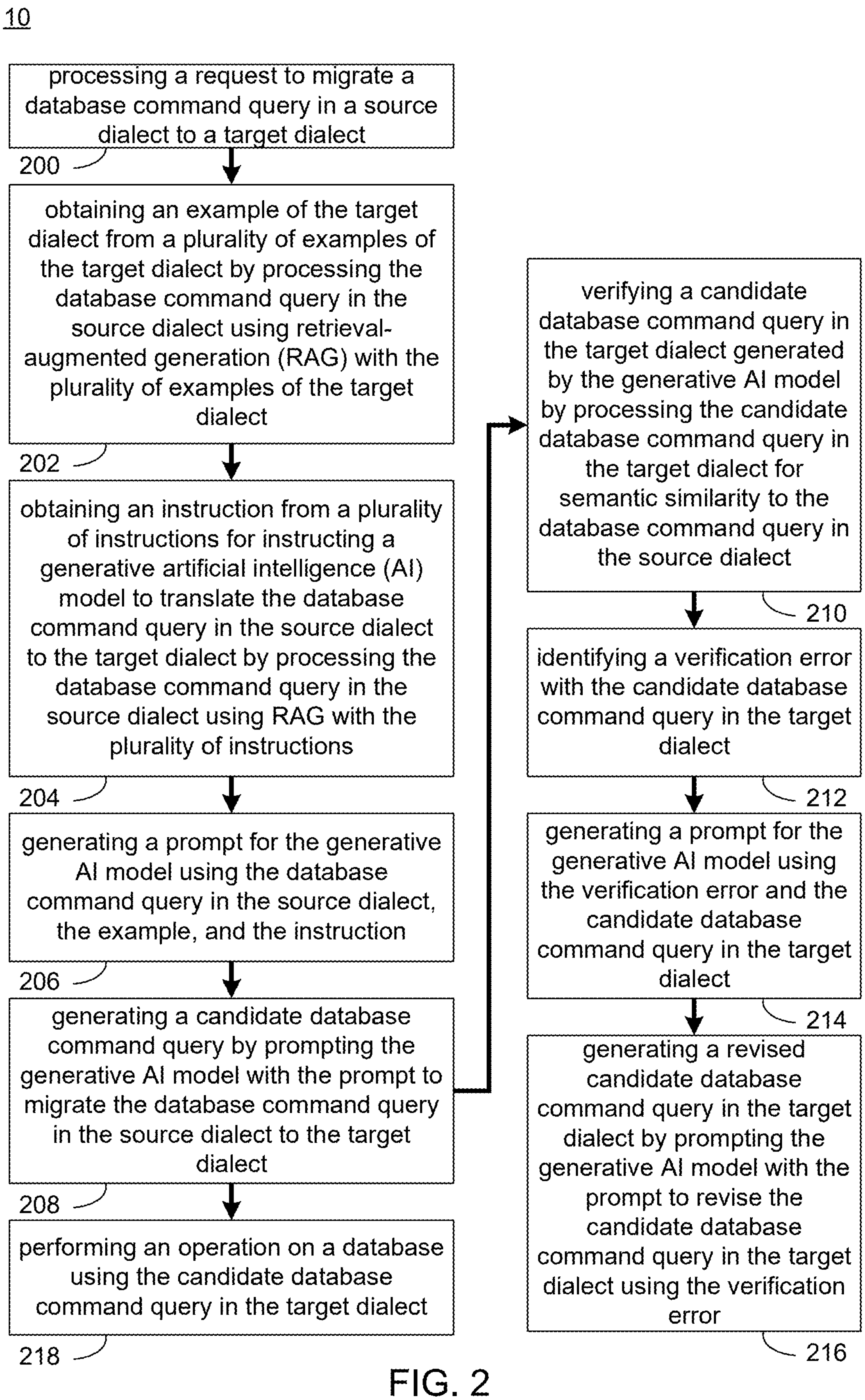
FIG. 2 is a flowchart of an embodiment of the query migration process.

Existing solutions based on tree parsers require a parser for each source dialect, an intermediate representation (IR), and a code generator that can generate target SQL from the IR. FIG. 1A illustrates a conventional approach for SQL migration, in which a custom solution must be utilized for migration of each source dialect to each target dialect. FIG. 1B illustrates an embodiment of the query management process of the present disclosure, in which SQL queries from any source dialect to any target dialect. As described in greater detail below, embodiments of the present disclosure are directed toward a machine learning-based solution which considers the database command query migration problem as a text-to-text translation problem using generative AI models (e.g., large language models (LLMs)) and data. In some implementations, query migration process 10 formulates the migration as an incremental error correction process where the database command query in a source dialect is used to generate a prompt for a generative AI model where the prompt instructs the generative AI model to treat the database command query as an erroneous query in the target dialect. Query migration process 10 incrementally fixes errors using database command query documentation concerning the target dialect. A generative AI model-based solution is implemented that automatically processes documentation concerning the source dialect, the target dialect, and examples of the mapping between each to reliably translate the intent specified using source database command query into an equivalent target database command query.

The details of one or more implementations are set forth in the accompanying drawings and the description below. Other features and advantages will become apparent from the description, the drawings, and the claims.

The Query Migration Process:

Referring to FIGS. 2-6, query migration process 10 processes 200 a request to migrate a database command query in a source dialect to a target dialect. An example of the target dialect is obtained 202 by processing the database command query in the source dialect using retrieval-augmented generation (RAG) with the plurality of examples of the target dialect. An instruction is obtained 204 for instructing a generative artificial intelligence (AI) model to translate the database command query in the source dialect to the target dialect by processing the database command query in the source dialect using RAG with the plurality of instructions. A prompt is generated 206 for the generative AI model using the database command query in the source dialect, the example, and the instruction. A candidate database command query is generated 208 by prompting the generative AI model with the prompt to migrate the database command query in the source dialect to the target dialect.

Figure 3:
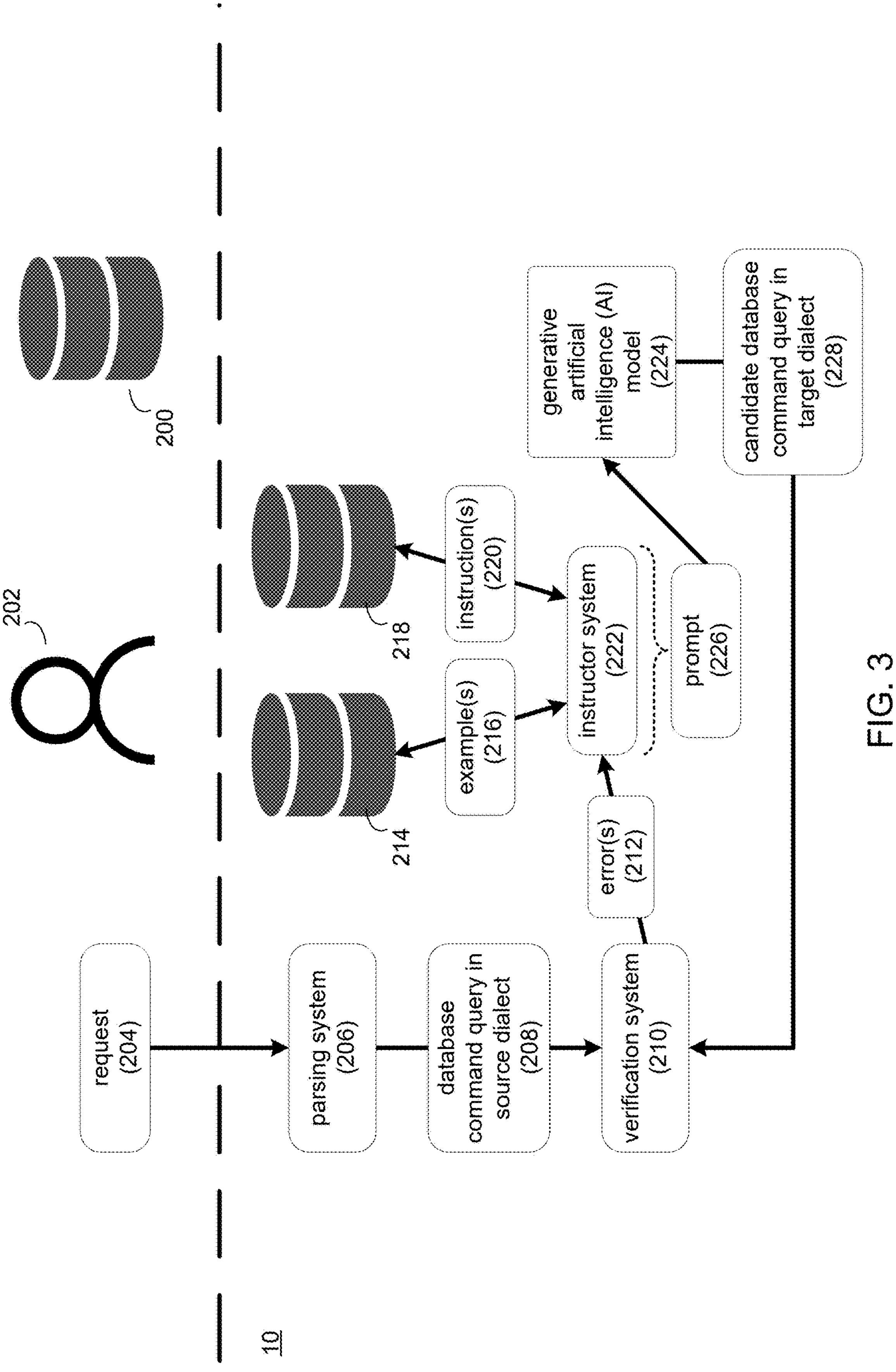
FIG. 3 is a diagrammatic view of the query migration process.
Figure 7:
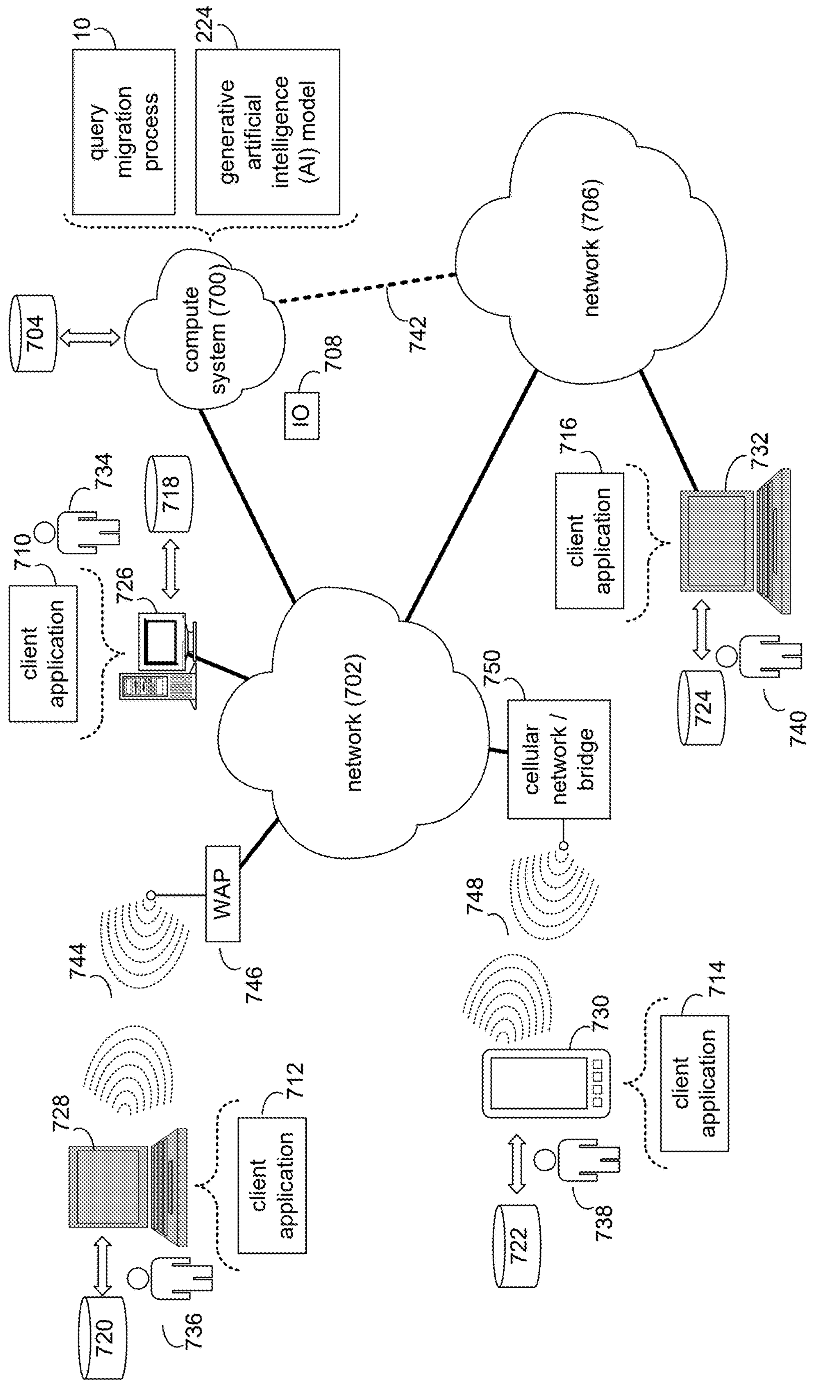
FIG. 7 is a diagrammatic view of a computer system and the query migration process coupled to a distributed computing network.

In some implementations, query migration process 10 processes 200 a request to migrate a database command query in a source dialect to a target dialect. For example, an electronic database is a digital collection of data that is stored and managed using computing devices and systems. Electronic databases are designed to allow users to search, retrieve, update, and manage data efficiently. In some implementations, electronic databases are organized in a structured format or schema (e.g., tables, fields, records, etc.). Referring also to FIG. 3 and in some implementations, an electronic database (e.g., electronic database 300) is accessible to a user (e.g., user 302) over a computing network (e.g., as shown in FIG. 7 and as described in greater detail below). In one example, electronic database 300 is stored in a single storage system. In another example, electronic database 300 is stored across multiple storage devices and/or storage systems in a cloud storage system.

In some implementations, query migration process 10 processes a request (e.g., request 304) for migrating a database command query from a source dialect to a target dialect. For example, a database command query is a request for data from a database that is written in specialized format or schema. In one example, the database command query is a query formatted in Structured Query Language (SQL). However, it will be appreciated that the database command query may be generated in various language formats within the scope of the present disclosure. In some implementations, the database command query is initially formatted in a particular dialect (i.e., source dialect). Examples of a source dialect for SQL queries include T-SQL, Postgres, Snowflake, Oracle, and others. In some implementations, request 304 includes a request from user 302 to query migration process 10 (e.g., provided as a text-based request and/or a spoken request) for migrating a database command query from a source dialect to a target dialect.

In some implementations, query migration process 10 parses the request for the database command query in the source dialect. For example, query migration process 10 parses the request (e.g., request 304) to identify two elements: 1) the query to migrate, 2) the source dialect, 3) the target dialect, and 4) the return type of the query, if applicable. A return type is the data type of the result that a database command query produces, and its inclusion helps query migration process 10 to migrate the database command query from the source dialect to the correct target dialect with the same semantic meaning. Parsing is represented in FIG. 3 as parsing system 306. Parsing system 306 includes hardware and/or software that processes an input request (e.g., request 304) to generate a parsed representation of request 304 including database command query in source dialect (e.g., database command query in source dialect 308) and, in some implementations, the return type. For example and in some implementations, parsing system 306 includes existing hardware and/or software components that process input text and generated parsed representations according to various parameters.

Referring again to FIG. 3 and in some implementations, query migration process 10 processes database command query in source dialect 308 to determine whether the database command query is subject to any errors or other issues for resolution. In some implementations, query migration process 10 processes database command query in source dialect 308 to identify errors in database command query in source dialect 208 relative to the target dialect. In this manner and as will be discussed in greater detail below, query migration process 10 uses these errors relative to the target dialect to direct the generative AI model to migrate the database command query from the source dialect by representing the difference between the target dialect and the source dialect as discrete errors for the generative AI model to resolve. This is represented in FIG. 3 as verification system 310 which is a hardware and/or software system that processes database command queries to identify errors in the formatting of the database command query relative to a specific dialect. With verification system 310, query migration process 10 generates error(s) in the database command query in source dialect 308 relative to the target dialect (e.g., error(s) 312).

In some implementations, query migration process 10 obtains 202 an example of the target dialect from a plurality of examples of the target dialect by processing the database command query in the source dialect using retrieval-augmented generation (RAG) with the plurality of examples of the target dialect. For example, query migration process 10 accesses a set of examples (e.g., from example database 314). In some implementations, example database 314 contains a set of examples that can be provided to the generative AI model to help guide it in performing the translation. In some implementations, the example of the target dialect includes a source-target dialect pair with an example database command query in the source dialect and a corresponding example database command query in the target dialect. For example, example database 314 includes source-target data pairs to demonstrate migration. A sample source-target dialect pair is shown in FIG. 4 with a first dialect example (e.g., first dialect example 400) and a second dialect example (e.g., second dialect example 402). Examples are effective demonstrations of complex migrations that require rewriting blocks of queries. In some implementations, inline comments in a target query at the right position also play an important role. Depending on the database command query, inline comments can either be added at the end, at the front or both for reinforcement.

With example database 314, examples similar to the input are obtained and concatenated into a prompt. Different from instructions which is input agnostic, several examples are selected that are most effective for each individual example based on similarity (e.g., cosine similarity). In some implementations, examples that are most similar to the entire database command query string are selected. The choice of retrieval method is important as it has a direct impact on example quality process which further has a decisive effect on model performance. In some implementations, the entire database command query is embedded as a single string for the purpose of similarity computation.

To obtain 202 an example, query migration process 10 uses retrieval-augmented generation (RAG). RAG is an artificial intelligence framework for improving the quality of generative AI model-generated responses by grounding the generative AI model on external sources of knowledge to supplement the generative AI model's internal representation of information. Implementing RAG in a generative AI model-based question answering system ensures that the generative AI model has access to the most relevant and reliable facts. RAG reduces the need for users to continuously train the generative AI model on new data and update its parameters as circumstances evolve. In this way, RAG can lower the computational and costs of running a generative AI model-powered system. Using RAG, query migration process 10 obtains 202 an example or examples (e.g., example(s) 316) for migrating database command query in source dialect 208 to the target dialect.

In some implementations, query migration process 10 obtains 204 an instruction from a plurality of instructions for instructing a generative artificial intelligence (AI) model to translate the database command query in the source dialect to the target dialect by processing the database command query in the source dialect using RAG with the plurality of instructions. An instruction is a set of rules or directives for migrating a database command query from a source dialect to a target dialect. Examples of instructions are shown in FIG. 5 (e.g., example instructions 500). In some implementations, a plurality of instructions concerning each source dialect and target dialect, an instruction database (e.g., instruction database 316) contains a set of rules describing the differences between source and target dialects. The instructions are selected per source-target dialect. In one example, the same set of instructions is used for a specific source-target. For instance, the few shot examples are selected dynamically based on closest match per query. In some implementations, the instructions are created and updated based on observations about the variations in source and target dialects. For categories like data type, functions, statements, the differences are listed between source dialect and target dialect in a table. Other differences that require lengthy description are placed under "Other" rules. As with example 314, query migration process 10 obtains 204 an instruction (e.g., instruction 318) from instruction database 320 for instructing a generative AI model to translate database command query in source dialect 308 to the target dialect. In this example, query migration process 10 uses RAG with database command query in source dialect 308 to obtain instruction 318 concerning migrating a database command query from the source dialect to the target dialect.

In some implementations, the instruction includes an instruction to resolve an error in formatting of the database command query, wherein the instruction indicates that the database command query is already in the target dialect. For example and described above, query migration process 10 uses a generative AI model to process a prompt concerning database command query in source dialect 308 with example 316 and instruction 320, where instruction 320 instructs the generative AI model to resolve or correct error 312 from database command query in source dialect 308 as if the database command query is already in the target dialect. In this manner, the generative AI model is instructed to process the database command query as though the differences between the source dialect and the target dialect are errors in the database command query in the target dialect.

In some implementations, the obtaining of examples and instructions is guided by an instructor system (e.g., instructor system 322). For example, instructor system 322 is a hardware and/or software system that processes error(s) from verification system 310 and database command query in source dialect 308 to obtain 204 example 316 and instruction 320. In some implementations, instructor system 322 generates actionable suggestions for a generative AI model to resolve the errors identified by verification system 310.

In some implementations, query migration process 10 uses a generative AI model (e.g., generative AI model 306) to translate or migrate the database command query in the source dialect to the target dialect based on the errors, examples, and/or instructions obtained. A generative artificial intelligence (AI) model (e.g., generative AI model 324) is configured to receive input prompts including text, audio content, and/or images. In some implementations, the generative AI model is a multimodal generative AI model, where multimodal refers to the ability of the generative AI model to understand and generate content in different forms (e.g., text, audio, and images). In one example, generative AI model 324 includes a neural network with many parameters (typically millions or billions of weights or more), trained on large quantities of unlabeled and/or labeled data using self-supervised learning, semi-supervised learning, and/or fine-tuning of the weights to cater the neural network for particular tasks or workloads. In some implementations, generative AI model 324 is one of a large language model (LLM) and a large multimodal model (LMM).

Language models are machine learning models that can generate a series of tokens (words) in a language on which they are trained. Beyond the simple generation of tokens, recent advances in language models that have been trained on an extremely large corpora of text and other media have demonstrated impressive capabilities for general purpose language understanding and generation. LLMs are attractive for users for several reasons. Firstly, the barrier of entry for LLMs is quite low as the API for using it quite simple: natural language. Secondly, LLMs are ready to use without further training on a particular domain. Thirdly, for more accurate use cases in specific domains, LLMs can learn from just a few examples without requiring large datasets for training unlike traditional machine learning models. In one example, generative AI model 324 is the Generative Pre-trained Transformer (GPT) LLM from OpenAIR. In another example, generative AI model 324 is the Bidirectional Encoder Representations from Transformers (BERT) LLM from Google®. Accordingly, it will be appreciated that various types of generative AI models are usable within the scope of the present disclosure.

In some implementations, query migration process 10 generates 206 a prompt for the generative AI model using the database command query in the source dialect, the example, and the instruction. In some implementations, query migration process 10 migrates database command query in source dialect 308 to the target dialect by prompting generative AI model 324 using "few-shot learning". With few-shot learning, query migration process 10 provides a prompt to generative AI model 324 including a number of examples of the form {input, output}, where input is the description of the task and output is the expected result generated by generative AI model 324 for the respective input. Few-shot learning generally leads to a more accurate answer compared to when no examples are provided in the prompt. Large language models have been shown to exhibit good performance when provided with few-shot examples for a wide variety of tasks or inputs.

In some implementations, the prompt includes the following segments: a system message defining the persona and overarching goal of generative AI model 324, instruction 320 specifying functional differences between source and target dialects, guidance on the output format (e.g., based on the return type), and few shot examples (e.g., examples 316) retrieved from example database 314 illustrating migration between source and target dialects. In some implementations, query migration process 10 generates a prompt (e.g., prompt 326) for resolving the errors (e.g., error 312) in database command query in source dialect 308 relative to the target dialect. In one example, this generation is performed by instructor system 322. Instructor system 322 is an integral component in the self-refinement process of problem-solving LLM agents. This process is pivotal for reflecting on and refining suboptimal solutions. Instructor system 322's primary function is to analyze erroneous queries and provide precise, actionable feedback for rectification. For instance, it might suggest replacing the database command "CREATE OR REPLACE PROCEDURE" with "CREATE OR ALTER PROCEDURE." This task is particularly challenging as it necessitates accurate bug identification, localization of the relevant code segments, and a comprehensive understanding of the SQL dialect to ascertain the cause of the error and offer explicit instructions. To streamline error analysis, the Chain-of-Thought (CoT) prompting technique is employed, which has become a standard for enhancing model performance on intricate tasks. This technique involves delineating the task into a series of steps and directing generative AI model 324 to execute these sequentially. CoT effectively breaks down large tasks into smaller, manageable units, providing insight into the generative AI model's process.

In some implementations, generative AI model 324 is trained in the specific database command query dialects. Without this level of knowledge, it is unlikely that the generative AI model will furnish suitable recommendations. The generative AI model's expertise is derived from two sources: its intrinsic knowledge acquired during pretraining, and external information (i.e., example 316 and instruction 320) accessed through the RAG process. In some implementations, query migration process 10 directs generative AI model 324 to determine whether to rely on its internal knowledge or to seek out pertinent documents. For example, should query migration process 10 lack a threshold amount of confidence in the internal knowledge base of the generative AI model, query migration process 10 will formulate questions related to the bugs and initiate a search for relevant documentation (e.g. using instructor system 322). With the relevant documents, it proceeds to provide suggestions and prompts for generative AI model 324.

To ensure high quality instructions, query migration process 10 prompts the generative AI model to do a self-reflection: can it propose suggestions and/or generate a candidate database command query in the target dialect with its internal knowledge, or is external documentation (i.e., examples and instructions) required? If it is sufficient confident (i.e., relative to a threshold) in using its internal knowledge alone, then it will skip triggering the RAG process for examples and instructions. Otherwise, examples and instructions are obtained, as discussed above.

In some implementations, query migration process 10 generates 208 a candidate database command query by prompting the generative AI model with the prompt to migrate the database command query in the source dialect to the target dialect. For example, generative AI model 324 processes prompt 326 to generate 208 a candidate database command query in the target dialect (e.g., candidate database command query in target dialect 328) by correcting the error (e.g., error 312) using the context information provided by example 316 and instruction 320. In some implementations, generative AI model 324's output includes candidate database command query in target dialect 228 and a report providing a description of the modifications made to database command query in source dialect 308. In some implementations, the specific changes are shown as inline comments in the migrated query. In this manner, the inline comments and the report provide end users with the insights to the process of generative AI model 324 in generating candidate database command query in target dialect 328.

In some implementations, query migration process 10 verifies 210 a candidate database command query in the target dialect generated by the generative AI model by processing the candidate database command query in the target dialect for semantic similarity to the database command query in the source dialect. For example, query migration process 10 processes candidate database command query in target dialect 328 to determine whether candidate database command query in target dialect 328 is semantically similar (i.e., has the same meaning) as database command query in source dialect 308. In this example, verification system 310 facilitates semantic equivalence evaluation between the source query and generated query. In some implementations, query migration process 10 uses a generative AI model (either generative AI model 324 or a separate generative AI model) to evaluate semantic equivalence. However, evaluating semantic equivalence between two database command queries is a complex task, as it requires a generative AI model to not only understand the execution plan of the queries, but also to generate a synthetic database and a prediction of execution results. To assist the generative AI model in this verification, Chain-of-Thought (CoT) prompting techniques break down the complex task into manageable, sub-tasks that reflect human thought process. This greatly improves the generative AI model's performance, especially with identifying database command queries that are not equivalent.

Figure 6:
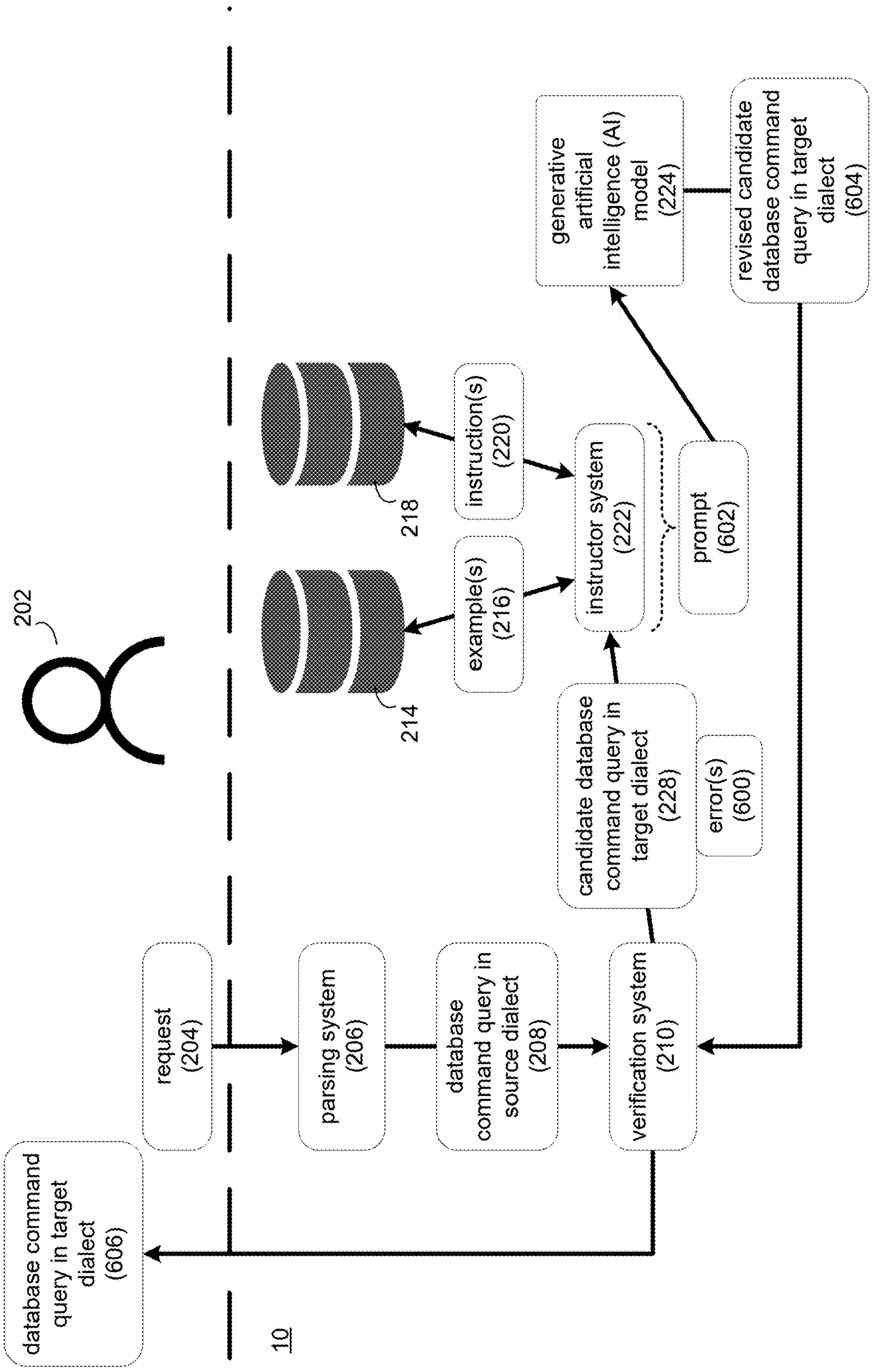
FIG. 6 is a diagrammatic view of the query migration process.

In some implementations, verifying 210 the candidate database command query in the target dialect includes identifying 212 a verification error with the candidate database command query in the target dialect. For example, a verification error is an error in candidate database command query in target dialect 328 that prevents the candidate database query from being semantically equivalent to database command query in source dialect 208 and/or that a syntactic error. Referring also to FIG. 6 and in some implementations, the verification error includes a syntactic verification error and a semantic verification error. A syntactic verification error is a syntax error relative to the syntax requirements of the target dialect. In some implementations, query migration process 10 verifies the syntax of candidate database command query in target dialect 328 by calling a parser (e.g., paring system 306). In one example, parsing system 306 is a T-SQL parser. Alternatively, the query may be executed on a sample warehouse to assert that there are no parsing errors. If there are no syntax errors, it will return "parse success", indicating that candidate database command query in target dialect 328 is syntactically valid for the target dialect. If not, the syntactic verification errors (e.g., error 600) are provided to instructor system 322.

In some implementations, query migration process 10 verifies 210 for semantic verification errors by processing candidate database command query in target dialect 328 using a generative AI model to verify the equivalence of the generated output and the original query. In one example, a separate generative AI model is used to identify a semantic verification error (e.g., error 600) in the comparison of candidate database command query in target dialect 328 and database command query in source dialect 308. In some implementations, the verifying for semantic verification errors can be summarized into the following steps: 1) directing the generative AI model to explain the query execution plan of both scripts; 2) generating a database schema based on the source scripts; 3) generating an imaginary database; and 4) predicting the results from executing both database command queries on this database. If the results are not equivalent, then query migration process 10 identifies a semantic verification error with candidate database command query in target dialect 328.

In some implementations, verifying 210 the candidate database command query in the target dialect includes generating 214 a prompt for the generative AI model using the verification error and the candidate database command query in the target dialect. For example, if query migration process 10 identifies a syntactic verification error and/or a semantic verification error, query migration process 10 provides candidate database command query in target dialect 328 and error 600 to instructor system 322 to generate 214 a subsequent prompt (e.g., prompt 602). As with prompt 326, query migration process 10 generates 214 prompt 602 to resolve error 600. In some implementations, query migration process 10 obtains further examples and/or instructions to resolve error 600 with prompt 602.

In some implementations, verifying 210 the candidate database command query in the target dialect includes generating 216 a revised candidate database command query in the target dialect by prompting the generative AI model with the prompt to revise the candidate database command query in the target dialect using the verification error. For example and as with candidate database command query in target dialect 328, query migration process 10 processes prompt 602 with generative AI model 324 to generate 216 a revised candidate database command query (e.g., revised candidate database command query 604).

In some implementations, query migration process 10 performs 218 an operation on a database using the candidate database command query in the target dialect. For example and as with candidate database command query in target dialect 328, query migration process 10 processes revised candidate database command query 604 by verifying revised candidate database command query 604 for semantic equivalence with database command query in source dialect 308. Query migration process 10 iteratively verifies and generates database command queries until revised candidate database command query 604 is verified using verification system 310. Once each source SQL query has been converted to the associated target SQL query, the database migration is conducted. For example, query migration process 10 performs 218 an operation on a database (e.g., database 300) by providing database command query in target dialect 606 to the requesting user and executed. Accordingly, database command queries that were once in the source dialect are now in the target dialect and the database command queries are able to be conducted in the target query dialect. Once complete, operations on the database are carried out in the new target SQL dialect.

Consider an example of a migration from a source dialect (e.g., Snowflake) to a destination dialect (e.g., Fabric SQL). In this example, the migration is a complex procedure that requires multiple changes, including multi-line syntax change, function definition, variable assignment. In the RAG-based approach of query migration process 10, query migration process 10 obtains examples from both Snowflake and Fabric documents related to their incompatibilities by designing and creating example migrations and verifying the examples in both Snowflake and Fabric databases.

In this example, query migration process 10 migrates a database command query from Snowflake SQL to Fabric SQL, the database command query is parsed and verified to check the syntax of the query as if it were a Fabric query. If the query was a Fabric query, the Fabric parsing would succeed, and query migration process 10 would notify the user that the Fabric query is ready. Since it is not a Snowflake query, the parsing fails. For each iteration up to a maximum number of iterations, query migration process 10 loops through various tasks to generate a candidate database command query. Query migration process 10 analyzes the database command query and provides actionable and specific fix proposals to "correct" the erroneous Fabric query (which is actually a Snowflake query). If the query migration process 10 is unable to resolve the errors with the knowledge or capacity of generative AI model alone, query migration process 10 obtains further documentation to determine resolution actions. Once the instructor system has determined a fix proposal, it uses generative AI model 324 to fix the query. Once fixed by generative AI model 324 to generate candidate database command query 328, query migration process 10 verifies the candidate database command query to check the syntax of the query as if it were a Fabric query. If the verification is successful, query migration process 10 notifies the user that the Fabric query is ready. If the parsing is not successful, the candidate database command query is returned to the instructor system to continue the iterative process of "fixing" the query, so that it ultimately is migrated to a proper Fabric query. The loop is continued until the revised candidate database command query is verified.

System Overview:

Referring to FIG. 7, a query migration process 10 is shown to reside on and is executed by compute system 700, which is connected to network 702 (e.g., the Internet or a local area network). Examples of compute system 700 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of compute system 700 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of query migration process 10, which are stored on storage device 704 included within compute system 700, are executed by one or more processors (not shown) and one or more memory architectures (not shown) included within compute system 700. Storage device 704 may include: a hard disk drive; an optical drive; a RAID device; a random-access memory (RAM); a read-only memory (ROM); and all forms of flash memory storage devices. Additionally or alternatively, some portions of the instruction sets and subroutines of query migration process 10 are stored on storage devices (and/or executed by processors and memory architectures) that are external to compute system 700.

In some implementations, network 702 is connected to one or more secondary networks (e.g., network 706), examples of which include: a local area network; a wide area network; or an intranet.

Various input/output (IO) requests (e.g., IO request 708) are sent from client applications 710, 712, 714, 716 to compute system 700. Examples of IO request 708 include data write requests (e.g., a request that content be written to compute system 700) and data read requests (e.g., a request that content be read from compute system 700).

The instruction sets and subroutines of client applications 710, 712, 714, 716, which may be stored on storage devices 718, 720, 722, 724 (respectively) coupled to client electronic devices 726, 728, 730, 732 (respectively), may be executed by one or more processors (not shown) and one or more memory architectures (not shown) incorporated into client electronic devices 726, 728, 730, 732 (respectively). Storage devices 718, 720, 722, 724 may include: hard disk drives; tape drives; optical drives; RAID devices; random access memories (RAM); read-only memories (ROM), and all forms of flash memory storage devices. Examples of client electronic devices 726, 728, 730, 732 include personal computer 726, laptop computer 728, smartphone 730, laptop computer 732, a server (not shown), a data-enabled, and a dedicated network device (not shown). Client electronic devices 726, 728, 730, 732 each execute an operating system.

Users 734, 736, 738, 740 may access compute system 700 directly through network 702 or through secondary network 706. Further, compute system 700 may be connected to network 702 through secondary network 706, as illustrated with link line 742.

The various client electronic devices may be directly or indirectly coupled to network 702 (or network 706). For example, personal computer 726 is shown directly coupled to network 702 via a hardwired network connection. Further, laptop computer 732 is shown directly coupled to network 706 via a hardwired network connection. Laptop computer 728 is shown wirelessly coupled to network 702 via wireless communication channel 744 established between laptop computer 728 and wireless access point (e.g., WAP) 746, which is shown directly coupled to network 702. WAP 746 may be, for example, an IEEE 802.11a, 802.11b, 802.11g, 802.11n, Wi-Fi®, and/or Bluetooth® device that is capable of establishing a wireless communication channel 744 between laptop computer 728 and WAP 746. Smartphone 730 is shown wirelessly coupled to network 702 via wireless communication channel 748 established between smartphone 730 and cellular network/bridge 750, which is shown directly coupled to network 702.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. As used herein, the language "at least one of A and B" (and the like) as well as "at least one of A or B" (and the like) should be interpreted as covering only A, only B, or both A and B, unless the context clearly indicates otherwise. The language "one or more of A and B" (and the like) as well as "one or more of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

receiving a request to migrate a database command query in a source dialect to a target dialect;

obtaining an example of the target dialect from a plurality of examples of the target dialect by processing the database command query in the source dialect using retrieval-augmented generation (RAG) with the plurality of examples of the target dialect;

obtaining an instruction from a plurality of instructions for instructing a generative artificial intelligence (AI) model to translate the database command query in the source dialect to the target dialect by processing the database command query in the source dialect using RAG with the plurality of instructions, wherein the plurality of instructions formulates the translation as an incremental error correction;

generating a prompt for the generative AI model using the database command query in the source dialect, the example, and the instruction, wherein the prompt instructs the generative AI model to treat the database command query as an erroneous query in the target dialect; and generating a candidate database command query by prompting the generative AI model with the prompt to migrate the database command query in the source dialect to the target dialect, wherein generating the candidate database command query comprises iteratively correcting errors of the database command query with respect to the target dialect.

2. The computer-implemented method of claim 1, further comprising:

performing an operation on a database using the candidate database command query in the target dialect.

3. The computer-implemented method of claim 1, wherein the instruction includes an instruction to resolve an error in formatting of the database command query, wherein the instruction indicates that the database command query is already in the target dialect.

4. The computer-implemented method of claim 1, further comprising:

verifying a candidate database command query in the target dialect generated by the generative AI model by processing the candidate database command query in the target dialect for semantic similarity to the database command query in the source dialect.

5. The computer-implemented method of claim 4, wherein verifying the candidate database command query in the target dialect includes:

identifying a verification error with the candidate database command query in the target dialect;

generating a prompt for the generative AI model using the verification error and the candidate database command query in the target dialect; and generating a revised candidate database command query in the target dialect by prompting the generative AI model with the prompt to revise the candidate database command query in the target dialect using the verification error.

6. The computer-implemented method of claim 5, wherein the verification error includes a syntactic verification error and a semantic verification error.

7. The computer-implemented method of claim 1, wherein the example of the target dialect includes a source-target dialect pair with an example database command query in the source dialect and a corresponding example database command query in the target dialect.

8. A computing system comprising:
a memory; and
a processor, operatively coupled to the memory, configured to:
process a request to migrate a database command query in a source dialect to a target dialect,
parse the request for the database command query in the source dialect, to obtain an example of the target dialect from a plurality of examples of the target dialect by processing the database command query in the source dialect using retrieval-augmented generation (RAG) with the plurality of examples of the target dialect,
obtain an instruction from a plurality of instructions for instructing a generative artificial intelligence (AI) model to translate the database command query in the source dialect to the target dialect by processing the database command query in the source dialect using retrieval-augmented generation (RAG) with the plurality of instructions, wherein the plurality of instructions formulates the translation as an incremental error correction,
generate a prompt for the generative AI model using the database command query in the source dialect, the example, and the instruction, wherein the prompt instructs the generative AI model to treat the database command query as an erroneous query in the target dialect, and
generate a candidate database command query by prompting the generative AI model with the prompt to migrate the database command query in the source dialect to the target dialect, wherein generating the candidate database command query comprises iteratively correcting errors of the database command query with respect to the target dialect.

9. The computing system of claim 8, wherein the processor is further configured to:
verify a candidate database command query in the target dialect generated by the generative AI model by processing the candidate database command query in the target dialect for semantic similarity to the database command query in the source dialect.

10. The computing system of claim 9, wherein to verify the candidate database command query in the target dialect the processor is configured to identify a verification error with the candidate database command query in the target dialect.

11. The computing system of claim 10, wherein to verify the candidate database command query in the target dialect the processor is configured to generate a prompt for the generative AI model using the verification error and the candidate database command query in the target dialect.

12. The computing system of claim 11, wherein to verify the candidate database command query in the target dialect the processor is configured to generate a revised candidate database command query in the target dialect by prompting the generative AI model with the prompt to revise the candidate database command query in the target dialect using the verification error.

13. The computing system of claim 8, wherein the processor is further configured to:
perform an operation on a database using the candidate database command query in the target dialect.

14. The computing system of claim 8, wherein the example of the target dialect includes a source-target dialect pair with an example database command query in the source dialect and a corresponding example database command query in the target dialect.

15. A non-transitory computer readable medium having a plurality of instructions stored thereon which, when executed by a processor, cause the processor to:
process a request to migrate a database command query in a source dialect to a target dialect;
parse the request for the database command query in the source dialect;
obtaining an example of the target dialect from a plurality of examples of the target dialect by processing the database command query in the source dialect using retrieval-augmented generation (RAG) with the plurality of examples of the target dialect;
obtain an instruction from a plurality of instructions for instructing a generative artificial intelligence (AI) model to translate the database command query in the source dialect to the target dialect by processing the database command query in the source dialect using retrieval-augmented generation (RAG) with the plurality of instructions, wherein the plurality of instructions formulates the translation as an incremental error correction;
generate a prompt for the generative AI model using the database command query in the source dialect, the example, and the instruction, wherein the prompt instructs the generative AI model to treat the database command query as an erroneous query in the target dialect;
generate a candidate database command query by prompting the generative AI model with the prompt to migrate the database command query in the source dialect to the target dialect, wherein generating the candidate database command query comprises iteratively correcting errors of the database command query with respect to the target dialect;
verify a candidate database command query in the target dialect generated by the generative AI model by processing the candidate database command query in the target dialect for semantic similarity to the database command query in the source dialect; and
perform an operation on a database using the candidate database command query in the target dialect.

16. The non-transitory computer readable medium of claim 15, wherein the example of the target dialect includes a source-target dialect pair with an example database command query in the source dialect and a corresponding example database command query in the target dialect.

17. The non-transitory computer readable medium of claim 15, wherein the request includes a return type for the database command query in the target dialect.

18. The non-transitory computer readable medium of claim 15, wherein to verify the candidate database command query in the target dialect the processor is to identify a verification error with the candidate database command query in the target dialect.

19. The non-transitory computer readable medium of claim 18, wherein verifying the candidate database command query in the target dialect the processor is to generate a prompt for the generative AI model using the verification error and the candidate database command query in the target dialect.

20. The non-transitory computer readable medium of claim 19, wherein verifying the candidate database command query in the target dialect the processor is to generate a revised candidate database command query in the target dialect by prompting the generative AI model with the prompt to revise the candidate database command query in the target dialect using the verification error.

* * * * *